(12) United States Patent
Hishitani et al.

(10) Patent No.: US 8,067,101 B2
(45) Date of Patent: Nov. 29, 2011

(54) CAPACITOR ELECTRODE AND METHOD OF MANUFACTURING THE SAME

(75) Inventors: Yoshiko Hishitani, Yokohama (JP); Hidetoshi Nojiri, Yokosuka (JP); Didier Hamm, Gifu (JP); Masaharu Hatano, Yokohama (JP); Makoto Uchiyama, Miura (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 110 days.

(21) Appl. No.: 12/441,681

(22) PCT Filed: Sep. 14, 2007

(86) PCT No.: PCT/JP2007/067927
§ 371 (c)(1),
(2), (4) Date: Mar. 17, 2009

(87) PCT Pub. No.: WO2008/035627
PCT Pub. Date: Mar. 27, 2008

(65) Prior Publication Data
US 2009/0268371 A1    Oct. 29, 2009

(30) Foreign Application Priority Data

Sep. 21, 2006 (JP) .................................. 2006-255156
Aug. 8, 2007 (JP) .................................. 2007-206873

(51) Int. Cl.
*H01G 4/228* (2006.01)
*H01G 9/00* (2006.01)
*B05D 3/00* (2006.01)
*G11B 11/105* (2006.01)
*B32B 9/00* (2006.01)
*B32B 19/00* (2006.01)

(52) U.S. Cl. ..................... 428/701; 361/306.3; 361/502; 361/503; 427/294; 428/332; 428/702

(58) Field of Classification Search ............... 361/306.3, 361/502, 503; 427/294; 428/332, 701, 702
See application file for complete search history.

(56) References Cited

U.S. PATENT DOCUMENTS 5,963,417 A * 10/1999 Anderson et al. ............. 361/503
2006/0154071 A1   7/2006 Homma et al.
2006/0196410 A1* 9/2006 Hishitani et al. ................ 117/75

FOREIGN PATENT DOCUMENTS

JP         2002-299164 A    10/2002
(Continued)

OTHER PUBLICATIONS

Gu et al.. "Tungsten Oxide Nanowires on Tungsten Substrates", Nano Letters, vol. 2, 2002, pp. 849-851.*

(Continued)

*Primary Examiner* — Jennifer McNeil
*Assistant Examiner* — Jonathan Langman
(74) *Attorney, Agent, or Firm* — Foley & Lardner LLP

(57) ABSTRACT

This invention relates to a capacitor electrode which includes porous layers made of a fiber and/or a whisker containing crystal tungsten oxides. The tungsten oxide fiber and/or whisker contain $W_{18}O_{49}$ as a main ingredient. The tungsten oxide fiber and/or whisker are made on a substrate. When manufacturing the capacitor electrode the substrate or its precursor is heated in vacuo or in an inactive containing a minute amount of oxygen, thereby completing the fiber and/or whisker.

7 Claims, 11 Drawing Sheets (a)

(b)

FOREIGN PATENT DOCUMENTS

| | | |
|---|---|---|
| JP | 2004-103669 A | 4/2004 |
| JP | 2005-252217 A | 9/2005 |
| JP | 2006-063403 A | 3/2006 |
| JP | 2006-222321 A | 8/2006 |

OTHER PUBLICATIONS

Wang et al. "Li-driven electrochemical properties of WO3 nanorods", Nanotechnology, vol. 17, (2006), pp. 3116-3120.*

Zhang et al., "Three-Dimensional Heirarchial Structure of Single Crystalline Tungsten Oxide Nanowires: Construction, Phase Transition, and Volumetric Behaviour", Journal of Physical Chemistry C, vol. 113, 2009, pp. 1746-1750.*

Chen et al. "The influence of oxygen content in the sputtering gas on the self synthesis of tungsten oxide nanowires on sputter deposited tungsten films", Nanotechnology, vol. 17, 2006, pp. 217-223.*

Shigetoshi Tanisaki, "Crystal Structure of Monoclinic Tungsten Trioxide at Room Temperature", Journal of the Physical Society of Japan, vol. 15, No. 4, pp. 573-581 (1960).

M. Schiavello et al., "The Catalytic Decomposition of $N_2O$ over Tungsten Oxides", Zeitschrift fur Physikalische Chemie Neue Folge, Bd. 104, S. I65-176 (1977).

K. Viswanathan et al., "Crystal Structure and Charge Carrier Concentration of $W_{18}O_{49}$", Journal of Solid State Chemistry 36, pp. 45-51 (1981).

* cited by examiner

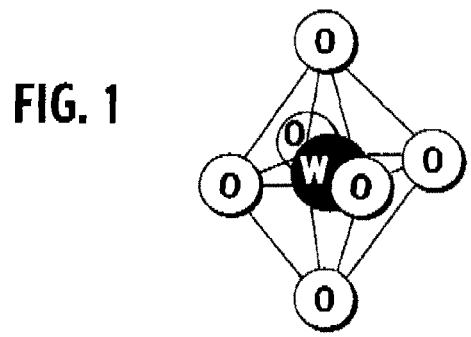
FIG. 1
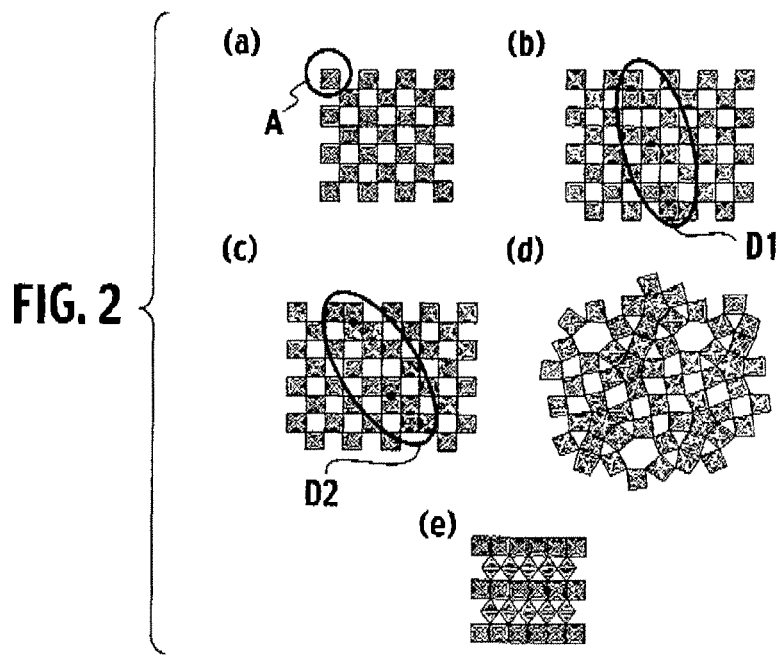
FIG. 2
FIG. 3
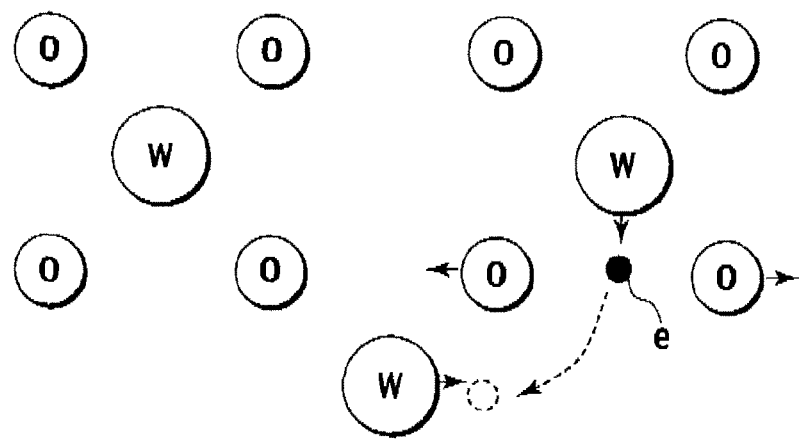

CAPACITOR ELECTRODE AND METHOD OF MANUFACTURING THE SAME

TECHNICAL FIELD

This invention relates to a capacitor electrode and a method of manufacturing the same.

BACKGROUND ART

Up to now, redox (oxidation-reduction) capacitors are popular. One example of such redox capacitors includes an electrode sheet, which is made by supporting an oxide such as manganese on a surface of activated carbon, mixing the activated carbon with conductive carbon or the like, and applying or rolling the mixed carbon onto a power collecting metal. Further, Patent Citation 1 discloses a capacitor in which electrodes are made of porous conductive ceramics prepared by the sol-gel process. Still further, Patent Citation 2 proposes a capacitor electrode which is made by uniformly forming a thin metal oxide film on acetylene black, and applying the thin oxide film onto a power collecting metal which has been mixed with carbon powder or the like.

The capacitor electrode of Patent Citation 1 has minute holes in the unit of nano and a large surface area. However, the conductive oxide of the capacitor electrode has a micromesh structure, so that the capacitor electrode suffers from high internal resistance and insufficient response. If a substrate for strengthening the capacitor electrode has poor conductivity, the capacitor electrode suffers from further increased internal resistance. With Patent Citation 2, the capacitor electrode has a large surface area, but becomes less effective as a whole since the carbon or the like has to be added. In addition, the power collector has to be used. Patent Citation 3 proposes a capacitor electrode which includes amorphous tungsten oxide, and has a large capacity. However, conductivity of a whisker itself is low compared with that of crystal tungsten oxides. Further, cyclic decay resistance of the whisker is low compared with that of the crystal tungsten oxide.

This invention has been contemplated in order to overcome problems of the related art, and is intended to provide a capacitor electrode which has low internal resistance and excellent conductivity, and a method of manufacturing such a capacitor electrode.

Patent Citation 1: Patent Laid-open Publication No. 2002-299164
Patent Citation 2: Patent Laid-open Publication No. 2004-103669
Patent Citation 3: Patent Laid-open Publication No. 2005-252217

DISCLOSURE OF INVENTION

The inventors have dedicated themselves to researches, have discovered that the foregoing object can be accomplished by providing a capacitor electrode with a fiber or a whisker including crystal tungsten oxides, and have invented a capacitor electrode. Specifically, the capacitor electrode has porous layers made of the fiber and/or whisker including tungsten oxides. The fiber and/or whisker are made of crystals whose composition is expressed by $WO_x$ ($2 < x \leq 3$). A manufacturing method of the capacitor electrode features that a substrate or its precursor is heated in vacuo or in an inactive gas containing a minute amount of oxygen in order to make the fiber and/or whisker.

BRIEF DESCRIPTION OF THE DRAWINGS

FIG. 1 is a pattern diagram showing an octahedral structure of $WO_3$.

FIG. 2 is a pattern diagram explaining an oxidation number and a crystal structure of the tungsten oxides.

FIG. 3 is a pattern diagram explaining polaron in a crystal and a polaron conduction image.

BEST MODE FOR CARRYING OUT THE INVENTION

Figure 4:
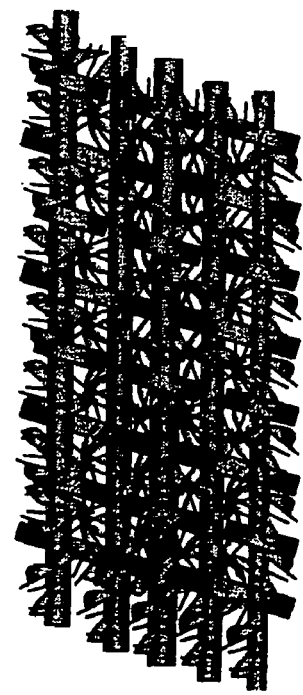
FIG. 4 is a schematic diagram showing shapes of specific examples of substrates.
Figure 4:
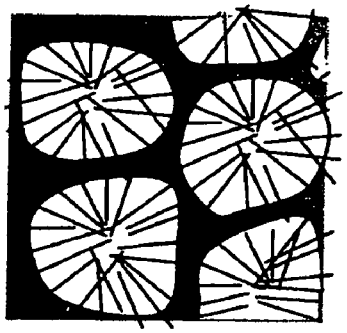
Figure 4:
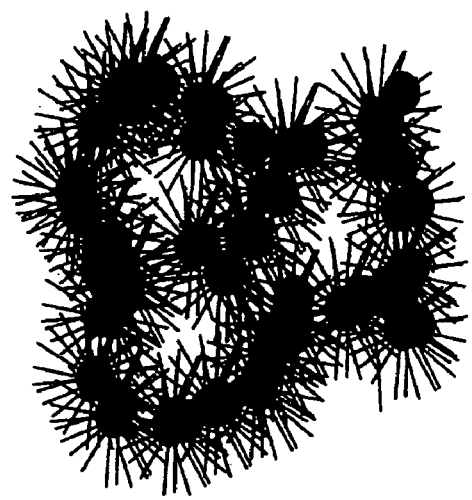
Figure 4:
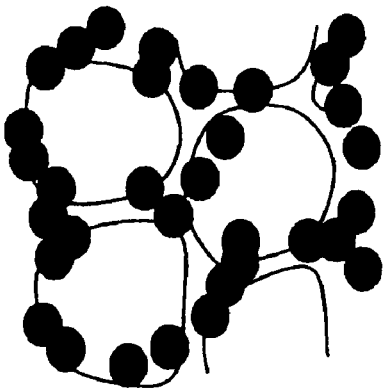

A capacitor electrode according to the invention will be described hereinafter. Unless otherwise specified, "%" attached to concentrations, contained amounts and filler contents and so on denotes an amount expressed as if it is part of a total which is 100.

[Composition of Capacitor Electrode]

The capacitor electrode of the invention includes porous layers which are made of fiber and/or whisker containing crystal tungsten oxides. A surface of the porous layers made of the tungsten oxide fiber and/or whisker is preferably structured to develop a pseudo capacitance response to adsorption-desorption or intercalation of positive ions (preferably the oxidation number is $WO_{2.72} \sim WO_3$). The porous layers made of the very conductive tungsten oxides lower an internal resistance of the capacitor electrode, which makes the capacitor electrode very conductive. The porous layers have a large surface area (which is several 10 times to several 100 times large) compared with a flat plate, which increases the pseudo capacitance. In addition, the porous layers may have a three-dimensional structure, so that a cubic capacity of a cell can be effectively utilized. Further, the use of tungsten oxide enables development of the pseudo capacitance caused by the adsorption and desorption of the positive ions. Still further, since the tungsten oxide fiber and whisker are mainly crystals, they are slow to melt, and have excellent cycling characteristics compared to fine grains obtained by the sol-gel process.

The tungsten fiber and/or the tungsten whisker are preferably made of crystals whose valencies are larger than divalent and are equal to or less than tetravalent. Crystal tungsten oxides such as $WO_3$, $WO_{2.9}$, and $WO_{2.72}$ have excellent conductivity. For instance, the tungsten oxide $WO_3$ has the conductivity of $0.27\Omega$ cm (refer to JOURNAL OF THE PHYSICAL SOCIETY OF JAPAN, 15, 573-581 (1960)). The tungsten oxides having the crystal structure can reduce the internal resistance of the capacitor electrode.

The crystal tungsten oxide fiber and/or whisker preferably have a growth direction (lengthwise direction) along an axis b of a crystal lattice, or have a (010) cross-sectional plane. It is considered that the tungsten oxides typified by $WO_3$ are constituted by a number of linked octahedral crystals $WO_6$ each of which is a minimum unit. Refer to FIG. 1.

When heated, the tungsten oxides having the foregoing structure lose oxygen, and the octahedral arrangement of $WO_3$ is locally deformed. In this state, $WO_3$ is considered to become metastable (refer to Z. Phyk. Chem. (N.F), 104, 165 (1977). FIG. 2(a) shows the octahedral arrangement A before it is deformed. FIG. 2, (b) to (e) show how the octahedral arrangement A of $WO_3$ is deformed while FIGS. 2(d) and (e) show how the octahedral arrangement A of $W_{18}O_{49}$ and $WO_2$ is deformed.

When structures which are constituted by the tungsten oxides $WO_6$ having the deformed octahedral arrangement get together on particular crystal planes, the tungsten oxides suffer from plane defects D1 and D2 as shown in FIGS. 2(b) and (c). With the tungsten oxides, when there are electrical biases such as electrons or holes between oxygen atoms and tungsten atoms of adjacent octahedral structures of $WO_3$, electric attractions or repulsions are applied to electric charges, which distorts crystal lattices.

It is considered that electric charges "e" which are localized by distortion hops between crystal lattices (i.e. polaron conduction), and the tungsten oxides become electrically conductive as shown in FIG. 3. Needless to say, if the structure of tungsten oxides is not cyclic, e.g. amorphous, the tungsten oxides become less conductive. Further, if the tungsten oxides have the crystal structure, plane defects lower the conductivity. In other words, electronic conductivity which is perpendicular to the plane defects becomes worsened, so that the resistance is increased.

Since the direction perpendicular to the (010) plane (in the direction of the axis b) is not influenced by the plane defects, excellent conductivity can be accomplished regardless of lack of oxygen. However, if the structure of $WO_2$ is deformed, the resistance is increased. This is because a conduction mechanism of $WO_2$ differs from that of $WO_3$. Therefore, it is very important to have the foregoing composition, and the crystal structure which grows in the direction of the axis b.

The tungsten oxide fiber and/or whisker preferably include $W_{18}O_{49}$ as a main ingredient. $W_{18}O_{49}$ has excellent conductivity, and a totally different low resistance compared with those of $WO_2$ or $WO_3$ ($2.75 \times 10^{-3} \Omega$ cm: J. of Solid State Chemistry 36, 45, 1981), so that the internal resistance of the electrode can be lowered. The term "main ingredient" denotes a substance which has a crystal structure and has a maximum spectral intensity based on analyses using the XRD or the like in comparison with other substances. The tungsten fiber and/or whisker may be $WO_3$, $W_2O_{74}$, $W_{25}O_{73}$, $W_{10}O_{29}$, $W_{24}O_{68}$, $W_5O_{14}$, $W_3O_8$ or the like.

The tungsten oxide fiber preferably has an average diameter of approximately 0.01 μm~1 μm, and is approximately 1 μm~10 cm long, for instance. The tungsten oxide whisker preferably has an average diameter of approximately 0.01 μm~10 μm, and is approximately long 1 μm~1000 μm long, for instance. Usually, the whisker is in the shape of a stem only. Alternatively, it may be in the shape of a branch, a mall or a fluff ball. The whisker can be made at a desired position on the surface of the capacitor electrode if the whisker does not adversely affect the application of the capacitor electrode or other manufacturing processes.

It is preferable that the tungsten oxide fiber and/or whisker are made on the substrate. In this case, the tungsten oxide fiber and/or whisker are in direct contact with the substrate, which is effective in strengthening the capacitor electrode as a whole.

The substrate is in the shape of a flat plate. Alternatively, the substrate may be in any shape, e.g. an alloy mesh as shown in FIG. 4(a), or a porous metal (a foam metal) as shown in FIG. 4(b), so long as the fiber and whisker can be attached. FIG. 4(c) shows the porous metal covered by powder. When the tungsten oxide whisker is used, the substrate is preferably molded before the whisker is made. Further, when the capacitor electrode includes the substrate provided with the whisker, the substrate preferably has metal layers at a part thereof. The metal layers are required to have high conductivity compared with conductivity of the tungsten oxide whisker, and has a power collecting function.

With the capacitor electrode of the invention, a whole surface of the substrate having the power collecting function contributes to an electromechanical reaction. Therefore, the capacitor electrode and the substrate function in unison, and can lower the internal resistance compared with a capacitor electrode to which a power collecting material is mixed as in the related art. Further, the capacitor electrode of the invention can improve its response.

The following metals have high conductivity compared with that of the tungsten oxide whisker: Fe, Co, Ni, Cu, Nb, Mo, Ru, Rh, Pd, Ag, Re, Ir, Pt, Au, Ti, V, Cr, Mn, Ta, or W, or alloys containing the foregoing metals.

The substrate is preferably made of an alloy containing tungsten and/or ceramics. In such a case, since the substrate, fiber and whisker are constituted by tungsten oxides in a continuous fashion, the substrate is in close contact with the fiber and/or whisker and becomes strong. Alternatively, when the substrate is made of the metal, no power collector is necessary. This improves electric contact. Therefore, the capacitor electrode has low internal resistance and good response.

Alloys of Al, Au. Co, Cr, Fe, Ir, Ti, V or Zr are usable. Ceramics may be made of WC (tungsten carbide), WB (tungsten boride), tungsten nitride, tungsten silicide, tungsten sulfide, tungsten oxide or the like.

It is preferable that the substrate has at least its surface partly covered by metal layers containing tungsten. In other words, the surface of the substrate is partly made of the material same as that of the fiber and whisker. In this case, a core of the substrate is preferably made of a different material. This is effective in enabling the capacitor electrode to have low internal resistance and to become stronger. The core of the substrate may be made of a material which keeps the substrate and the whisker in close contact with each other, and which has good physical strength and conductivity. The following materials are usable for instance: metals such as Fe, Co, Ni, Nb, Mo, Pt and Ti, and refractory ceramics made of aluminum oxide, silicon oxide or the like.

The substrate is preferably porous, which enables an electrolyte to efficiently infiltrate into the substrate through pores. The fiber and/or whisker provided on the porous substrate can increase a surface area of the capacitor electrode, which improves volumetric efficiency of the capacitor electrode.

Figure 5:
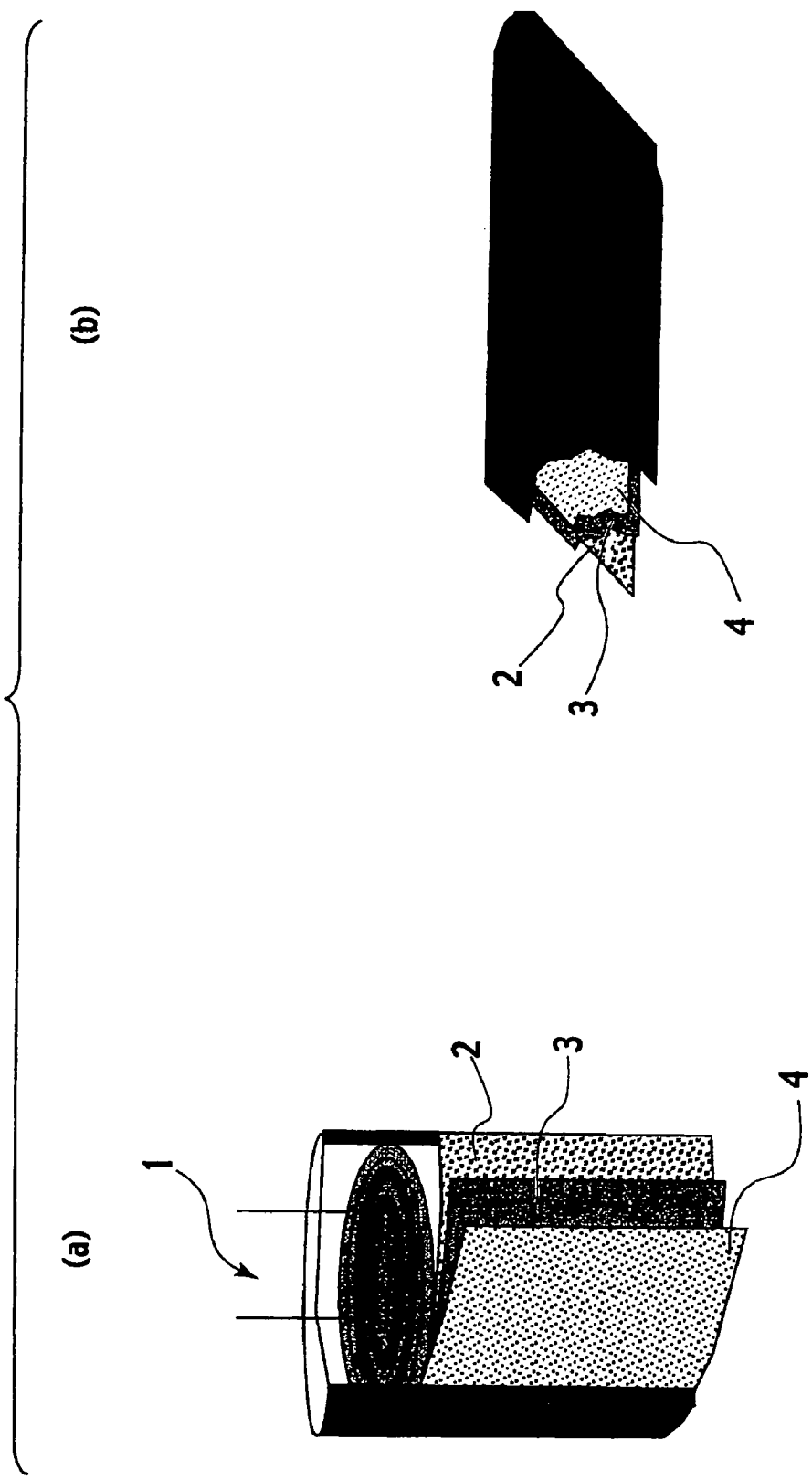
FIG. 5 is a schematic diagram showing structures of cells in which capacitor electrodes are used.

FIGS. 5(a) and (b) schematically show structures of cells constituted by the foregoing capacitor electrodes. Specifically, FIG. 5(a) is a cross-sectional view of a roll-shaped cell while FIG. 5(b) is a cross-sectional view of a laminated cell. In FIGS. 5(a) and (b), reference numeral 1 denotes a slot via which the cell is pulled out; reference numeral 2 denotes an electrolyte of a negative electrode; reference numeral 3 denotes an electrolyte of a separator; and reference numeral denotes an electrolyte of a positive electrode. The positive and negative electrodes are made of nonwoven alloy fibers covered by the $WO_3$ whisker while the separator is made of a nonwoven polymeric fiber. The electrolytes are solutions in which nonaqueous solvents such as polypropylene carbonate, dimethyl carbonate or ethylene carbonate are added with $LiPF_6$, $Et_4NBF_4$, $BF4$ or the like; aqueous KCL solutions having an adjusted Ph; or ionic liquids such as imidathorium salt group, pyridinium salt group, aliphatic quaternary ammonium salt or the like.

[Capacitor Electrode Manufacturing Method]

The following describe a method of manufacturing the capacitor electrode according to the invention.

The substrate material or its precursor is heated in vacuo or in an inactive gas containing a minute amount of oxygen, so that the fiber and/or whisker constituted by $W_{18}O_{49}$ are formed on the substrate. In this state, the capacitor electrode having low internal resistance is completed.

The substrate material and its precursor are heated at a temperature of 800° C.~1600° C., and is depressurized at vacuum of approximately 0.1 Torr~20 Torr. When oxygen is mixed into the inactive gas, the substrate material or its precursor should be heated so that an oxygen density is 1 ppm~10000 ppm. The inactive gas may be an argon (Ar) gas.

The phrase "the substrate and its precursor" is referred to considering a case in which the metal material may change its composition while it is being heated. Further, although an amount of an introduced gas depends upon a size of a reacting furnace or a size of the substrate, the inactive gas is preferably introduced at a rate of approximately 0.1 L~5 L per minute if the reacting furnace has a 3 L capacity.

EMBODIMENTS

The invention will be described in detail with reference to some embodiments. It is to be understood that the invention is not limited to the following embodiments.

Embodiment 1

Figure 6:
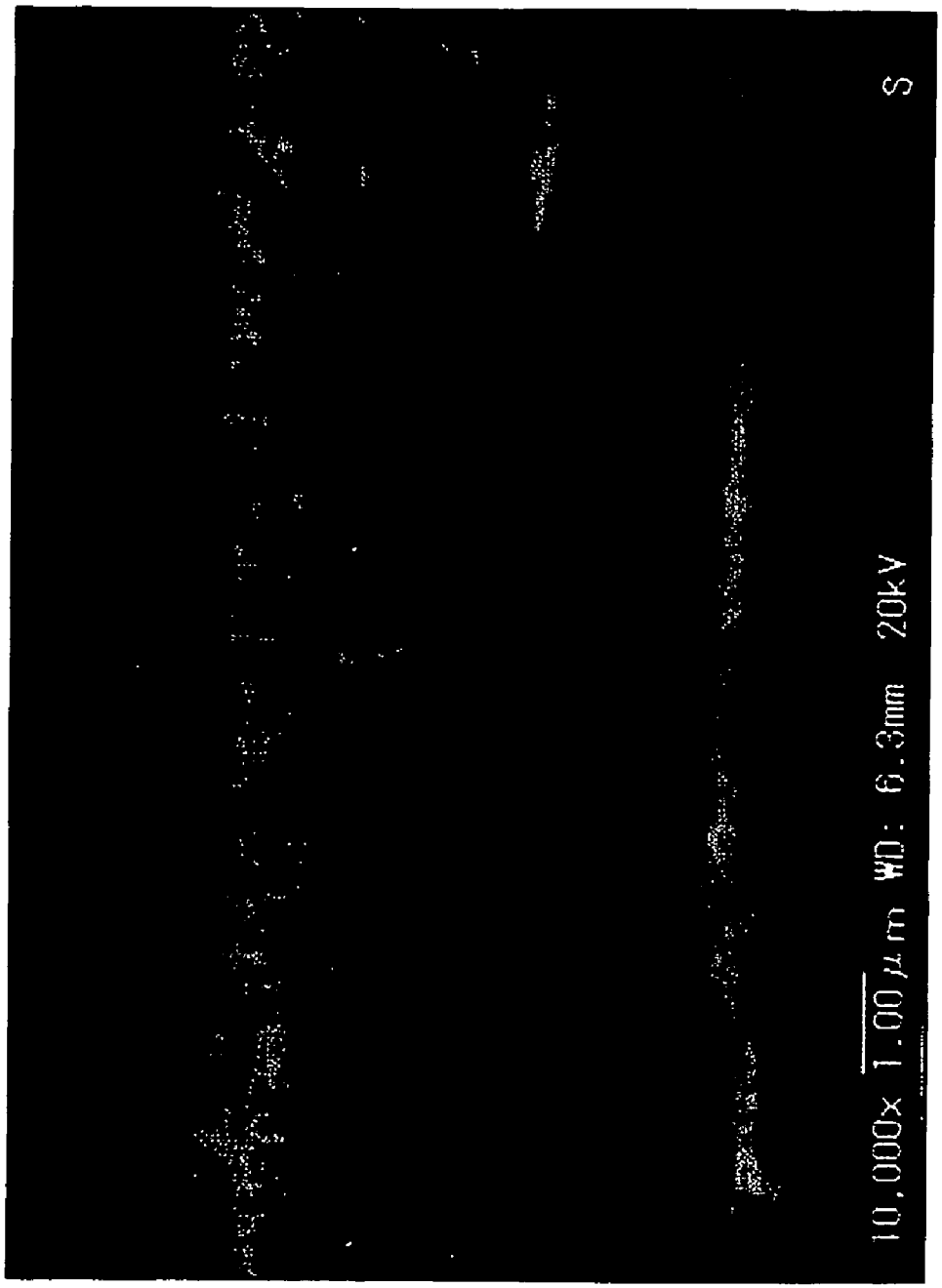
FIG. 6 is a picture showing a cross-sectional image of a tungsten oxide whisker observed by an SEM.
Figure 7:
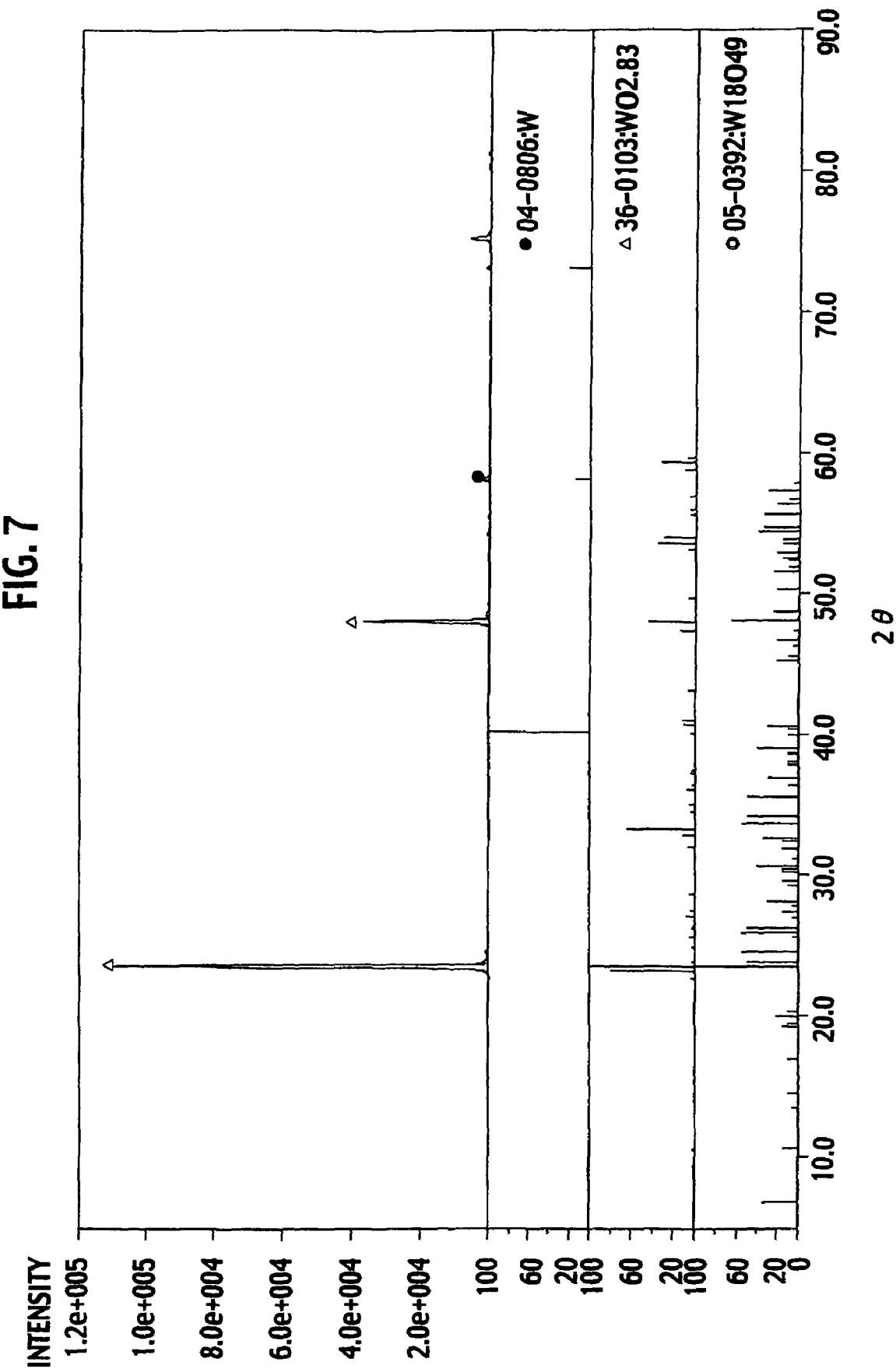
FIG. 7 is a graph showing spectrums of an electrode provided with the tungsten oxide whisker measured by an XRD.
Figure 8:
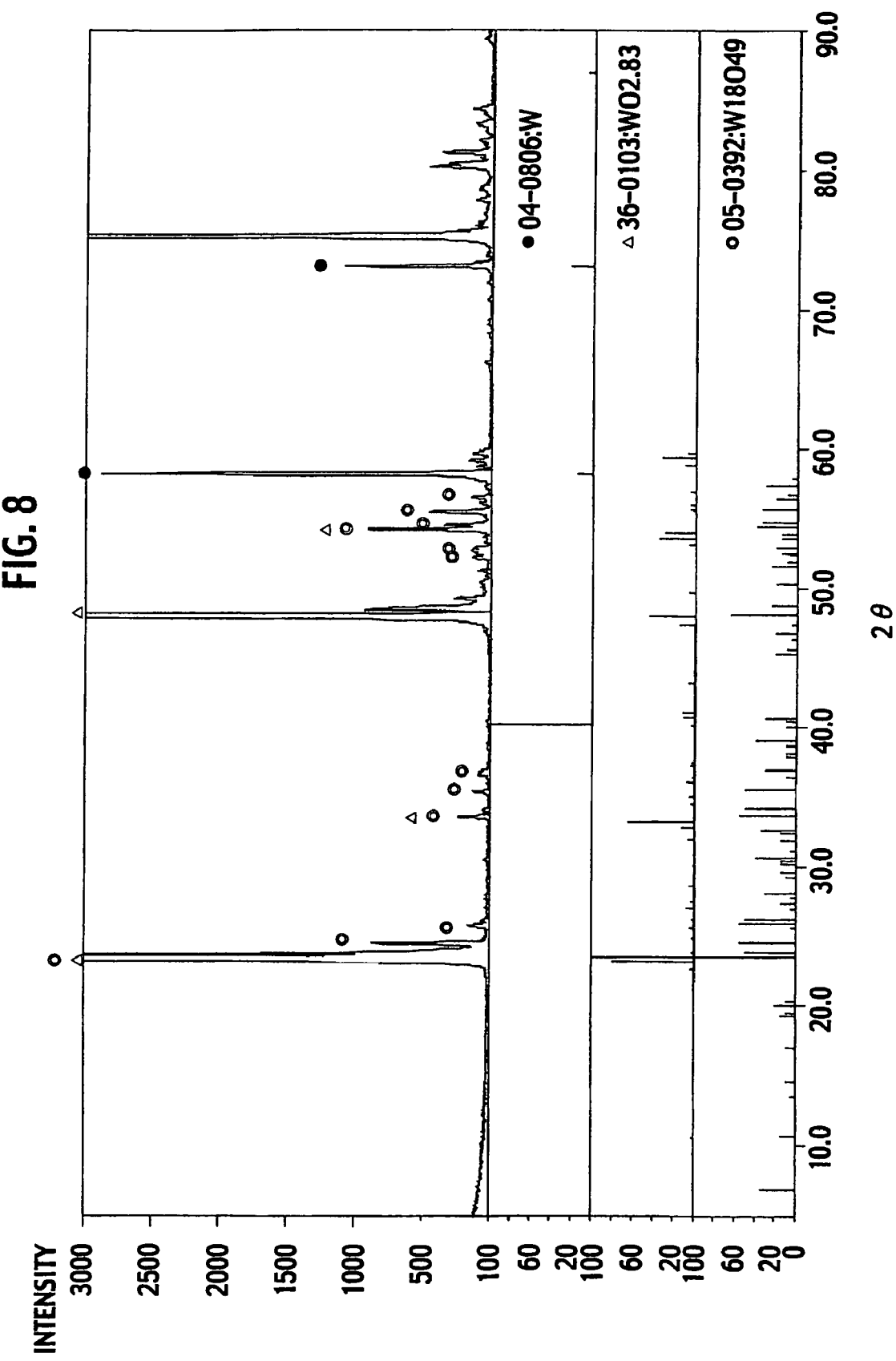
FIG. 8 is a graph showing spectrums, in an enlarged state, of an electrode provided with the tungsten oxide whisker measured by the XRD.

An Ni substrate having a sputtered tungsten film on it surface was heated to 1100° C. at a rate of 550° C./hour by applying an Ar gas into a furnace, was maintained at 1100° C. for two hours, and was then cooled to a room temperature in the furnace. FIG. 6 is a cross-sectional SEM view of the tungsten oxide whisker. The whisker was evaluated using the XRD, and was confirmed to include $W_{18}O_{49}$ and $WO_{2.33}$, and to have the (010)-orientated structure (see FIG. 7 and FIG. 8).

Figure 9:
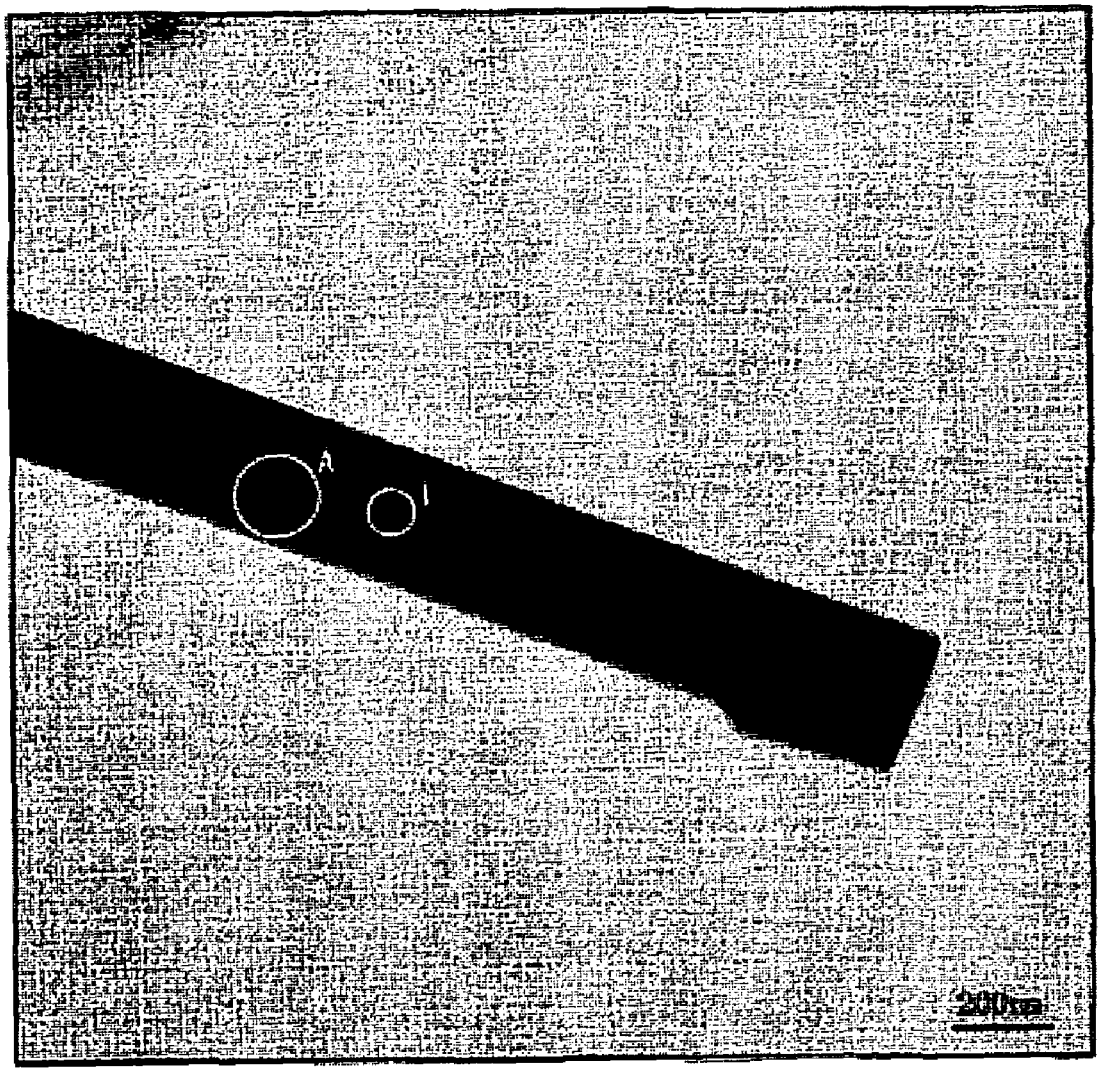
FIG. 9 is a picture showing an image of the tungsten whisker observed by a TEM.
Figure 10:
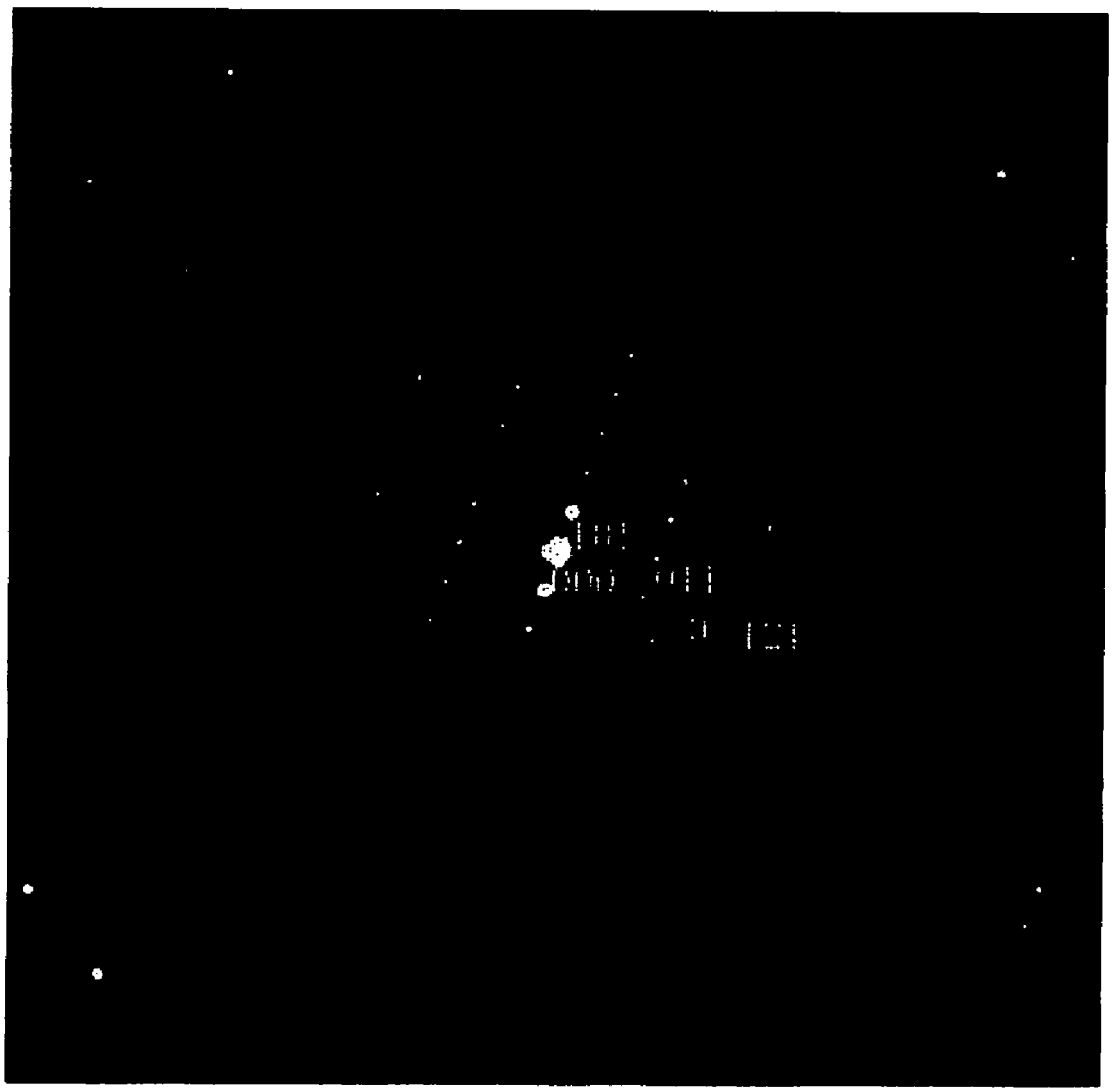
FIG. 10 is a picture showing diffracted images of electron beams of the tungsten oxide whisker ($W_{18}O_{19}$ being incident on [111] plane).
Figure 11:
FIG. 11 is a picture showing diffracted images of electron beams of the tungsten oxide whisker ($W_{18}O_{19}$ being incident on [101] plane).
Figure 12:
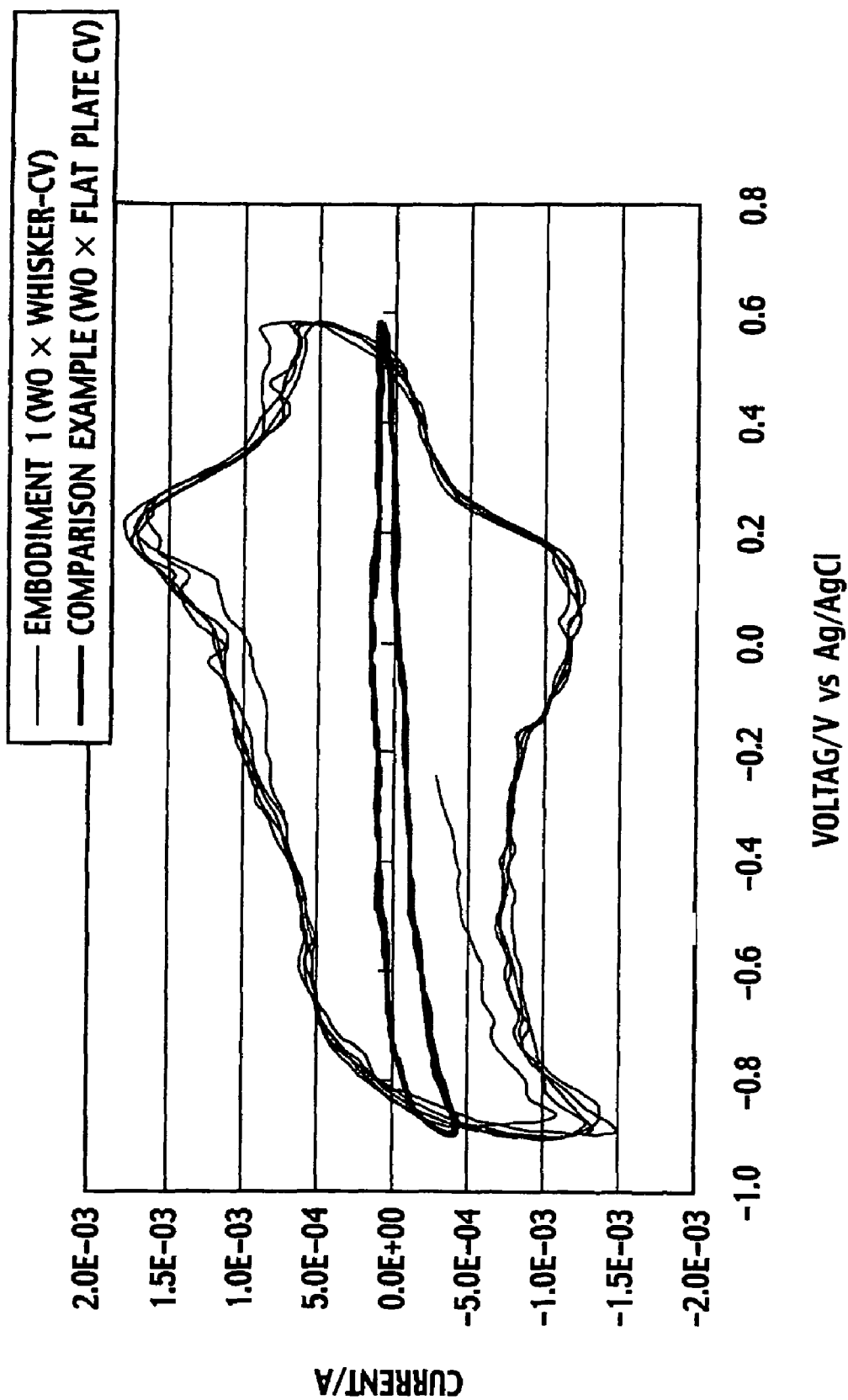
FIG. 12 is a graph showing results of cyclic tungsten voltammetric measurement.

Further, the whisker was analyzed based on electron-beam-diffracted images obtained by the TEM, and was confirmed to include a crystal of $W_{18}O_{49}$ in the direction of axis b which is in the lengthwise direction (as shown in FIG. 9 to FIG. 11). The whisker as an electrodes was subject to a cyclic voltammetric measurement. Results of the measurement are shown in FIG. 12. It is known that each electrode has a capacity of 20 mF/quasi $cm^2$.

Embodiment 2

Figure 13:
FIG. 13 is a picture showing a cross-sectional image of the tungsten oxide fiber observed by the SEM.

A flat tungsten plate was heated to 1100° C. at a rate of 550° C./hour under reduced pressure of approximately 1 Torr, was maintained at 1100° C. for 24 hours, and was then cooled. FIG. 13 shows an image of the obtained tungsten oxide fiber using the SEM. The fiber was evaluated using the XRD, and was confirmed to include $W_{18}O_{49}$ as a main ingredient.

Comparison Example 1

An Ni substrate which includes a tungsten film on it surface sputtered by a method of the related art was oxidized at 500° C. in the air, thereby completing an electrode provided with an oxidized surface.

(Measurement for Evaluation)

The electrodes of Embodiment 1 and Comparison Example 1 were used as active electrodes. Platinum plates were used as counterpart electrodes, and silver chloride silver electrodes were used as reference electrodes. These electrodes were repeatedly subject to cyclic voltammetric measurements using 1M KCl solutions as electrolytes at a potential scanning speed of 100 mV/s (refer to FIG. 12). Charging and discharging capacities of the electrodes were calculated, and variations of capacities per cycle were compared. A capacitance of slender whiskers, which was observed in FIG. 12, was 15 mF/quasi $cm^2$ (during a cycle for a CV2 measurement) while a capacitance of the electrode of the related art (having the tungsten oxide film) was 1.6 mF/quasi $cm^2$. As described above, the capacitor electrode in the best mode of the invention has a capacity which is approximately ten times larger than a capacity of a flat $WO_x$ plate, which means that the capacitor electrode of the invention has a capacitance which is approximately 500 times larger than an ordinary flat metal plate.

INDUSTRIAL APPLICABILITY

This invention is applicable to capacitor electrodes.

The invention claimed is:

1. A cell comprising:
 a capacitor electrode comprising: a sheet including nonwoven alloy fibers covered by whiskers containing crystal tungsten oxide, and each whisker having an average diameter of 0.01 μm to 10 μm and a length of 1 μm to 1000 μm,
 wherein a lengthwise direction of the tungsten oxide whiskers extends along an axis b of a crystal lattice of the tungsten oxide, and a cross-sectional surface of the axis b is a (010) plane of the crystal tungsten oxide,
 a separator laminated on the capacitor electrode, and
 an electrolyte infiltrated into both of the capacitor electrode and the separator.

2. The cell according to claim 1, wherein the whiskers are made of the crystal tungsten oxide expressed by $WO_x$ ($2<x\leqq3$).

3. The cell according to claim 1, wherein the tungsten oxide whiskers contain $W_{18}O_{49}$ as a main ingredient.

4. The cell according to claim 1, wherein the tungsten oxide whiskers are made on the nonwoven alloy fibers as a substrate.

5. The cell according to claim 4, wherein the substrate is porous.

6. A method of manufacturing a cell defined in claim 4, wherein the substrate or its precursor is heated at a temperature of 800 to 1600° C. in vacuo or in an inactive gas containing a minute amount of oxygen, thereby completing the whiskers.

7. The cell according to claim 1, wherein the separator comprises nonwoven polymeric fibers.

* * * * *